(12) United States Patent
Bernardet

(10) Patent No.: US 6,186,303 B1
(45) Date of Patent: Feb. 13, 2001

(54) DEVICE FOR CONVEYING PARTS USING GRAVITY

(75) Inventor: Patrick Bernardet, Sevrey (FR)

(73) Assignee: Eastman Kodak Company, Rochester, NY (US)

( * ) Notice: Under 35 U.S.C. 154(b), the term of this patent shall be extended for 0 days.

(21) Appl. No.: 09/342,717

(22) Filed: Jun. 29, 1999

(30) Foreign Application Priority Data

Jul. 10, 1998 (FR) .................................................. 98 09072

(51) Int. Cl.$^7$ .................................................. G07D 9/00
(52) U.S. Cl. .................................. 193/2 R; 193/DIG. 1; 194/344
(58) Field of Search ................ 193/2 R, 33, DIG. 1; 194/344

(56) References Cited

U.S. PATENT DOCUMENTS

| | | |
|---|---|---|
| 1,628,596 | 5/1927 | Milmoe . |
| 4,518,001 * | 5/1985 | Branham ................ 133/5 R |
| 4,795,018 | 1/1989 | Anderson ................ 193/2 C |
| 5,046,989 * | 9/1991 | Dass .................... 194/344 X |
| 5,125,493 * | 6/1992 | Abe ........................ 194/344 |
| 5,170,874 * | 12/1992 | Abe ..................... 193/DIG. 1 |
| 5,425,439 * | 6/1995 | Tsuchida ............. 193/DIG. 1 |
| 5,558,197 * | 9/1996 | Rothschild et al. ........ 194/344 |

FOREIGN PATENT DOCUMENTS

| | | |
|---|---|---|
| 0509235 A1 | 10/1992 | (EP) . |
| 2 240 073 | 3/1975 | (FR) . |
| 1351951 | 5/1974 | (GB) . |
| 2258861 | 2/1993 | (GB) . |

* cited by examiner

Primary Examiner—Janice L. Krizek
(74) Attorney, Agent, or Firm—David A. Novais

(57) ABSTRACT

A device for conveying parts by gravity that comprises first and second guides of length L equidistant from one another. Each guide has a U-shaped cross-section. An opening of one of the guides is arranged opposite the opening of the other guide so as to define a path for the parts to be conveyed. A contact surface between the guides and the parts is sufficient to hold the parts between the guides. The guides are made of a material that facilitates sliding of the parts to be conveyed.

10 Claims, 3 Drawing Sheets

DEVICE FOR CONVEYING PARTS USING GRAVITY

FIELD OF THE INVENTION

The present invention relates to a device for conveying parts by gravity, which is particularly useful for conveying flat parts.

BACKGROUND OF THE INVENTION

In manufacturing shops comprising various machines, sometimes each machine has to be fed with parts that are then assembled or modified by the machine. It is common for the feed to require a long continuous conveyance of the parts that is not always direct. It is sometimes necessary to allow for the presence of other machines that have to be avoided or to cross partitions or ceilings. Guiding devices then have paths that are not rectilinear to allow for the presence of obstacles. Such guides are not always accessible for an operator, much less so when the workshop can sometimes be in the dark. Most guides used are directly manufactured to form a non-rectilinear path that causes considerable manufacturing costs. Further, when it is required to feed a machine with flat parts that have to reach the machine in a precise position, a conveyor device that positions the parts perfectly must be used.

The use of a conveyor device constituted by a U-shaped guide as shown in FIG. 1A is known. The U-shaped guide 10 is made of Teflon® to facilitate the sliding of parts 11 in the conveyor device. The conveyor device has a shape that works perfectly with the shape of the parts 11 to be conveyed. As the whole surface of the part 11 is in contact with the guide 10, there is much friction between the parts and the guide. When for instance metal parts are conveyed in such a device, the friction of the parts on the Teflon® guide creates static electricity. Then the parts stay stuck to the support and a jam occurs in the guide. Further, when metal parts are covered with paint, this tends to be removed. In addition, such a conveyor guide cannot have any position. In fact, the guide's U-shape does not permit it to be rotated 180°, as the part would no longer be held in the guide.

The use of another type of guide in the form of a "C" shaped guide 10 as shown in FIG. 1B is also known. Here again, practically the whole surface of part 11 is in contact with the guide 10. The same problems as those encountered using the guide described in FIG. 1A appear.

SUMMARY OF THE INVENTION

An object of the invention is to provide for a device for conveying parts that limits the friction between the parts to be conveyed and the conveyor device so as to avoid static problems.

Another object of the invention is to provide for a device for conveying parts that can be arranged in various configurations.

It is also an object of the invention to provide for a simple and cheap process for the conveyor device.

The invention relates to a device for conveying parts by gravity that comprises two guides of length L equidistant from one another. Each guide has a U-shaped cross-section, and the opening of one of the U-shaped cross-sections is arranged opposite the opening of the other U-shaped cross-section so as to define a path of the parts to be conveyed. A contact surface between the guides and the parts is sufficient to hold the parts between the two guides, and the guides are made of a material that facilitates sliding of the parts to be conveyed.

The invention also relates to a process for making a device for conveying parts that comprises:

the production of each guide of length L from a flat element;

the fixing of a bracket on at least one side of the guides so as to hold the guides equidistant one from the other throughout their length L; and the shaping of the guides held equidistantly one from the other by the bracket into the position wanted.

The present invention also relates to a manufacturing process of a device for conveying parts by gravity which comprises the steps of: producing first and second guides having a length L from a flat element, each of the first and second guides being equidistant from each other and having U-shaped cross-sections, with the first guide having an opening which faces an opening of the second guide so as to define a path for parts to be conveyed therebetween, and each of the first and second guides being made of a material that facilitates sliding of the parts to be conveyed; fixing a bracket on at least one side of the first and second guides so as to hold the first and second guides equidistant from one another along their length L; and shaping the first and second guides and the bracket therebetween so as to define a desired conveyance path for the parts.

BRIEF DESCRIPTION OF THE DRAWINGS

Other characteristics will appear on reading the following description, with reference to the drawings wherein.

DETAILED DESCRIPTION OF THE INVENTION

Figure 1A:
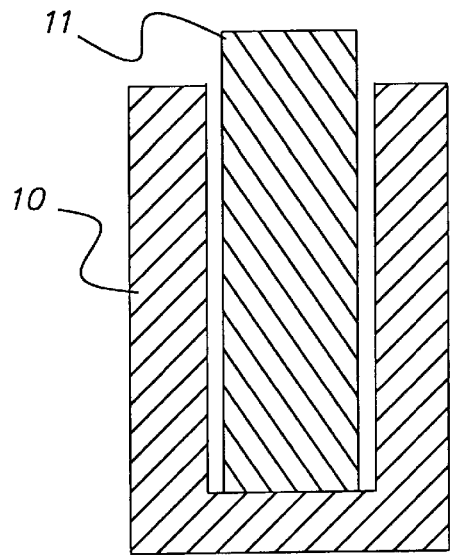
FIGS. 1A and 1B represent a device for conveying parts by gravity according to the prior art.
Figure 1B:
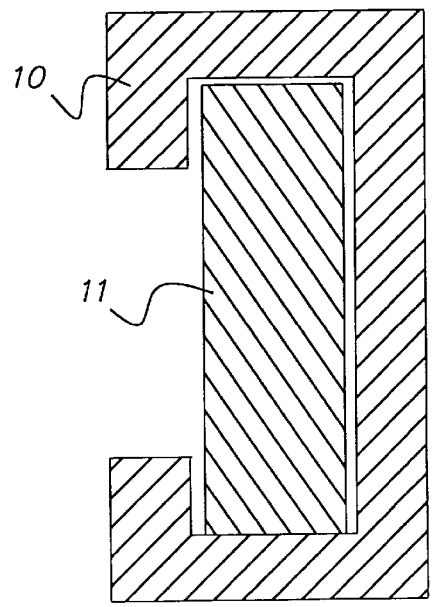
Figure 2:
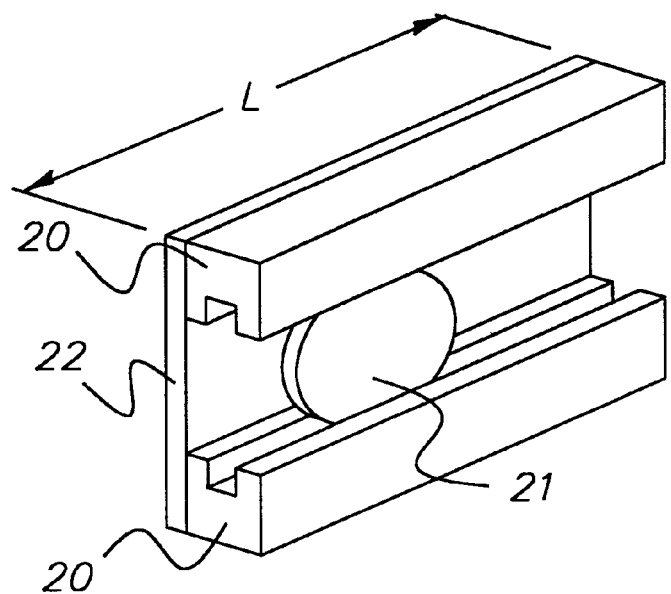
FIG. 2 represents a perspective view of a device according to the invention.

The device according to the invention is intended to convey parts by gravity. With reference to FIG. 2, part of a device can be seen that comprises two guides 20 each having a U-shaped cross-section. The opening of one of the U-shaped cross-sections is arranged opposite the opening of the other U-shaped cross-section. Thus the guides 20 define the path of parts 21 to be conveyed. The shape of the U-shaped cross-sections depends on the shape of the parts to be conveyed. Preferably, the shape of the guides 20 is such that the branches of the U-shaped cross-sections have a short length to limit the contact surface between the parts 21 and the guides 20. However, the branches should have a minimum length that is sufficient to hold the parts 21 between the two guides 20. The width of the guides 20 between the two branches of the U-shaped cross-sections should allow sufficient play for the parts 21 to be conveyed correctly while being guided, but should not be too large to avoid the parts 21 from piling up on each other when conveyed.

For example, circular section parts which have a diameter of about 25 mm and a thickness of about 2.7 mm can be conveyed. The guide used comprises two U-shaped portions. The distance between the U-shaped portions is about of 17 mm. The length of the branches inside the U-shaped portions is about of 5 mm, and the two branches of a U-shaped portion are spaced about 4 mm.

There is a play of about 2 or 3 mm in the height of the guide 20 and of about 1 to 3 mm in the width of the guide 20.

The guides 20 with U-shaped cross-section have a length L that depends on the distance the parts 21 are to be conveyed. The guides 20 are equidistant one from another for all their length L. They are held equidistantly one from another for all their length L by a bracket 22. Preferably, the bracket 22 is a flat part that is fixed onto one side of each guide 20 so that it is not in contact with the parts. Obviously, a bracket can be attached to each side of the guides 20. For example, the bracket 22 can be all along the guides 20. Preferably, the bracket 22 is made up of many flat parts attached in a spaced out way all along length L. Thus, if there is a conveying problem, it is easy for an operator to see the position of the conveyed parts in the guide.

Figure 3:
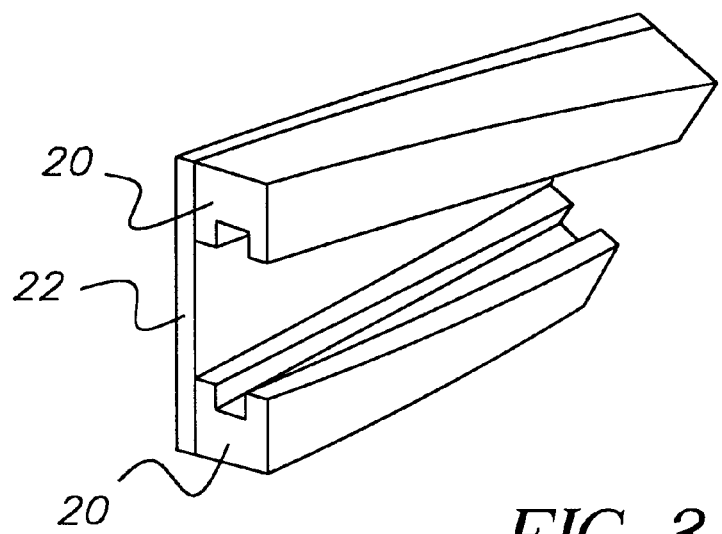
FIG. 3 represents a perspective view of part of the device when it is twisted.
Figure 4:
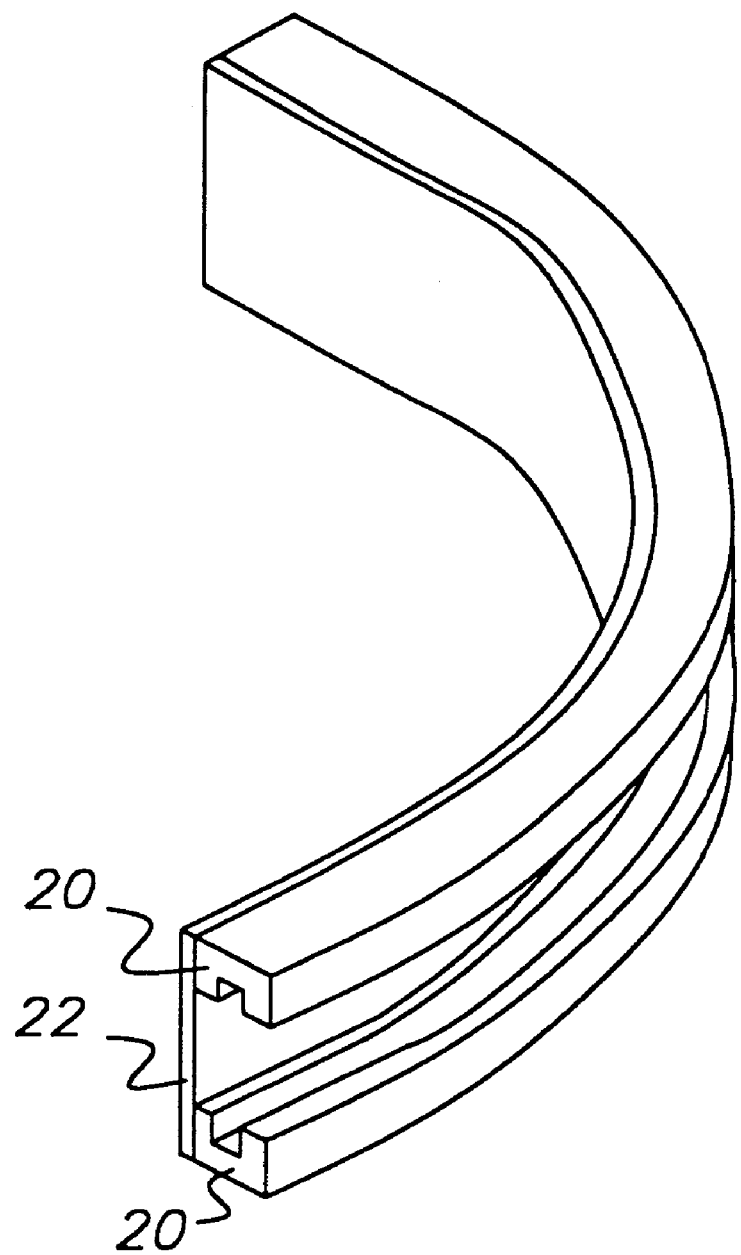
FIG. 4 represents a perspective view of part of the device when it is bent.

The material used for the guides 20 should, in part, facilitate the parts to slide, and in part, have sufficient elasticity so that the guide 20 can be shaped as required. The selected material is an organic polymer, for example polyethylene, polypropylene or fluorine polyvinyl. Preferably, an extruded polyethylene will be selected. The conveyor device can, for example, be twisted as shown, in FIG. 3. The parts are always held by the guides, even for example when the device is twisted 180°. Thus, the device allows the parts to be rotated when they have to be conveyed and to reach the machine to be fed in a precise position. For example, when caps are introduced in the conveying device by a first machine in one position and if a second machine which is to be fed requires receiving the caps in another position, it is useful to twist the guides such that the caps are fed in the required position. Such a conveyor device can be adapted between any feeding machine and receiving machine without the need of a robot that would change the position of the caps. It is therefore very cheap and simple. The conveyor can also be bent as shown in FIG. 4 when required by the layout of the machine, for example to avoid other machines. The skilled person in the art will choose the radius of curvature with respect to the dimension of the parts to be conveyed.

The process of making the guide according to the invention is particularly simple. Each U-shaped guide 20 is effectively produced from a flat part. The bracket(s) is (are) then attached to the two guides to hold them in a position equidistant one from the other. When required by the layout of the machine to be fed and the parts feed device, the conveyor device is shaped with the two guides held equidistantly one from the other. Thus, the shaping can be done directly in the installation place of the conveyor device.

The conveyor device of the invention enables the parts to be conveyed by gravity. Its layout is such that the guides link a feed device of parts to be conveyed, such as for instance a vibrating bowl containing loose parts, to a machine. The feed device is positioned in height so that the conveyor device is arranged with a descending slope between the parts feed and the machine to be fed. The slope necessary to assure correct conveyance of the parts by gravity in particular depends on the weight and shape of the parts to be conveyed. If the parts are round shaped, the slope is not necessarily very accentuated. The conveyor device according to the invention does not require any energy to move the parts.

The invention has been described in detail with particular reference to certain preferred embodiments thereof, but it will be understood that variations and modifications can be effected within the spirit and scope of the invention.

What is claimed is:

1. A device for conveying parts by gravity, the device comprising:

first and second guides of length L equidistant from one another, each of said first and second guides having a U-shaped cross-section, an opening of one of said first and second guides being arranged opposite to an opening of the other of said first and second guides so as to define a path for parts to be conveyed therebetween, a contact surface between the first and second guides and the parts being sufficient to hold the parts between the first and second guides, and the first and second guides being made of an organic polymer that facilitates sliding of the parts to be conveyed.

2. A device according to claim 1, wherein the first and second guides are made of a material having sufficient elasticity to be shaped.

3. A device according to claim 1, wherein the organic polymer is selected from polyethylene, polypropylene or fluorine polyvinyl.

4. A device according to claim 1, wherein the first and second guides are held equidistant one from another for their whole length L by a bracket arranged on at least one side of the first and second guides.

5. A device according to claim 4, wherein each of said first and second guides and said bracket are made of an elastic material which permits a twisting of said first and second guides and said bracket so as to enable a rotation of the parts during a conveyance of the parts.

6. A manufacturing process of a device for conveying parts by gravity that comprises first and second guides of length L equidistant from one another, with each of the first and second guides having a U-shaped cross-section, and an opening of one of the first and second guides being arranged opposite an opening of the other of the first and second guides so as to define a path for parts to be conveyed, a contact surface between the first and second guides and the parts being sufficient to hold the parts between the first and second guides, and the first and second guides being made of an organic polymer that facilitates sliding of the parts to be conveyed, the process comprising the steps of producing each of the first and second guides of length L from a flat element;

fixing a bracket on at least one side of the first and second guides so as to hold the first and second guides equidistant one from the other throughout their length L; and shaping the first and second guides held equidistantly one from the other by the bracket into a desired position.

7. A process according to claim 6, wherein the shaping comprises twisting the first and second guides and the bracket.

8. A process according to claim 6, wherein the shaping comprises bending the first and second guides and the bracket.

9. A manufacturing process of a device for conveying parts by gravity, the process comprising the steps of:

producing first and second guides having a length L from a flat element, each of said first and second guides being equidistant from each other and having U-shaped cross-sections, said first guide having an opening which faces an opening of said second guide so as to define a path for parts to be conveyed therebetween, each of said first and second guides being made of an organic polymer that facilitates sliding of the parts to be conveyed;

fixing a bracket on at least one side of the first and second guides so as to hold the first and second guides equidistant from one another along their length L; and shaping the first and second guides and the bracket therebetween so as to define a desired conveyance path for said parts.

10. A process according to claim 9, wherein said shaping step comprises the step of twisting said first and second guides and said bracket.

* * * * *